April 13, 1954    W. H. BLASHFIELD    2,675,515
BATTERY CHARGING APPARATUS

Filed Feb. 6, 1947    4 Sheets-Sheet 1

INVENTOR.
William H. Blashfield
BY
ATTORNEYS

April 13, 1954  W. H. BLASHFIELD  2,675,515
BATTERY CHARGING APPARATUS
Filed Feb. 6, 1947  4 Sheets-Sheet 2

INVENTOR.
William H. Blashfield
BY
Brown, Jackson, Boettcher & Dienner
ATTORNEYS April 13, 1954  W. H. BLASHFIELD  2,675,515
BATTERY CHARGING APPARATUS
Filed Feb. 6, 1947  4 Sheets-Sheet 3

INVENTOR
William H. Blashfield
BY
Brown, Jackson, Boettcher & Diemer
ATTORNEYS

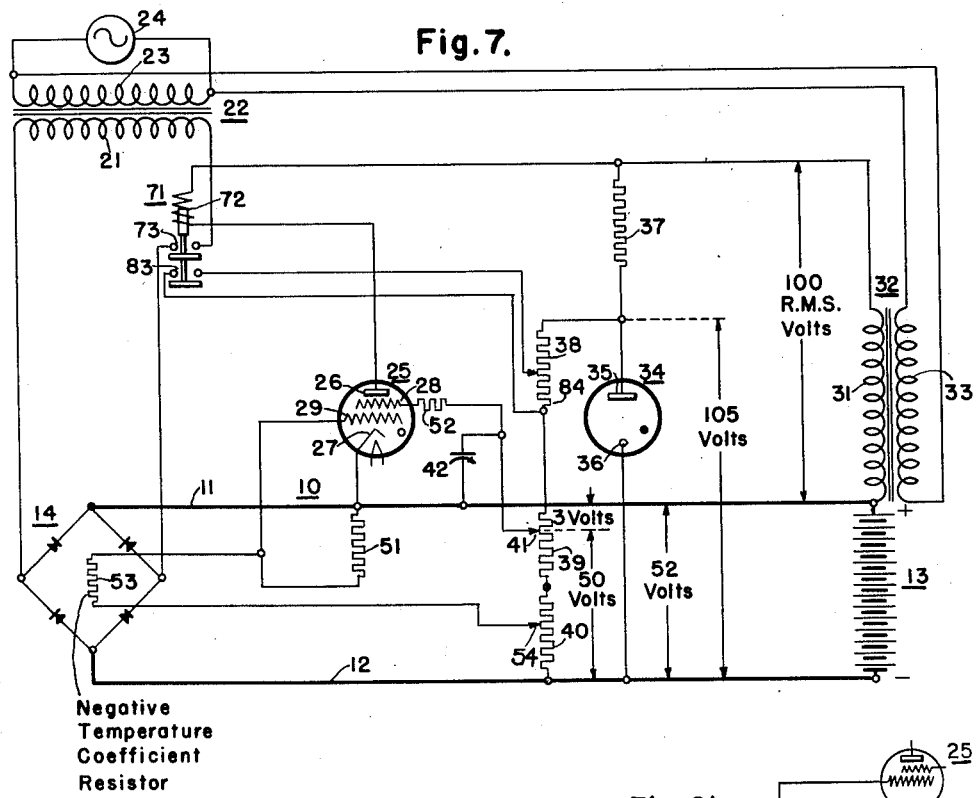
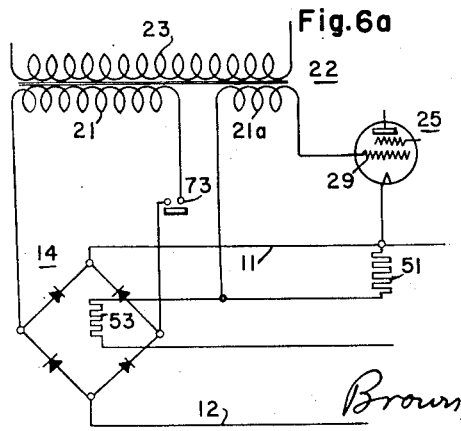
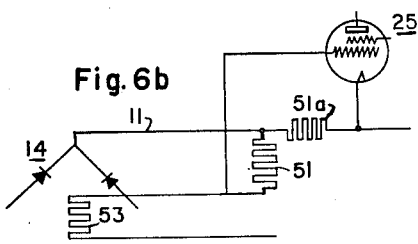
INVENTOR.
William H. Blashfield
BY
Brown, Jackson, Boettcher & Dienner
ATTORNEYS Patented Apr. 13, 1954

2,675,515

UNITED STATES PATENT OFFICE 2,675,515

BATTERY CHARGING APPARATUS

William H. Blashfield, Galion, Ohio, assignor to The North Electric Manufacturing Company, Galion, Ohio, a corporation of Ohio Application February 6, 1947, Serial No. 726,814

22 Claims. (Cl. 320—32)

1

This invention relates, generally, to circuit control apparatus and systems and it has particular relation to the control of the flow of current from the current source to a load circuit, such as from a source of direct current to a battery for charging the same.

Among the objects of this invention are: To control accurately the energization of a load circuit, such as a load circuit including a battery to be charged, from a supply circuit including a device such as a dry or tube type rectifier or a direct current generator; to provide a fixed reference voltage with respect to which the load circuit or battery voltage can be compared for effecting this control; to vary the current flow to the load circuit to charge the battery when its voltage falls below a predetermined value and to prevent the flow of current thereto when its voltage rises above a predetermined value; to control the magnitude of current flow from a rectifier of the dry type to the load circuit in accordance with its temperature; to prevent the rectifier from operating when its temperature rises above a predetermined safe-operating temperautre; to control the magnitude of current flow through a rectifier of the tube type to the load circuit in accordance with the current flow to the same; to cause the current to flow through the load circuit to charge the battery when its voltage falls below a predetermined value and to prevent the flow of current thereto only when it rises above a predetermined value that is substantially higher than that at which current is caused to flow and vice versa to prevent operation on small change in the load circuit or battery voltage; to employ a relay for effecting the control and to cause it to operate when the battery voltage falls to a predetermined value and to remain operated until it rises to a substantially higher value and vice versa to prevent pumping of the relay on small voltage changes; and to combine the temperature control of the system with the anti-pumping feature.

Other objects of this invention will, in part, be obvious and in part appear hereinafter.

Accordingly, this invention is disclosed in the embodiments thereof shown in the accompanying drawings, and it comprises the features of construction, combination of elements, arrangement of parts, and circuit connections described in detail hereinafter and the scope of the application of which is indicated in the appended claims.

For a more complete understanding of the nature and scope of this invention, reference

2 may be had to the following detailed description, taken together with the accompanying drawings, in which.

Figures 6a and 6b illustrate modification of the control voltage source; and Figure 7 illustrates, diagrammatically, how the anti-pumping feature can be obtained through the use of contacts on the relay.

Figure 1:
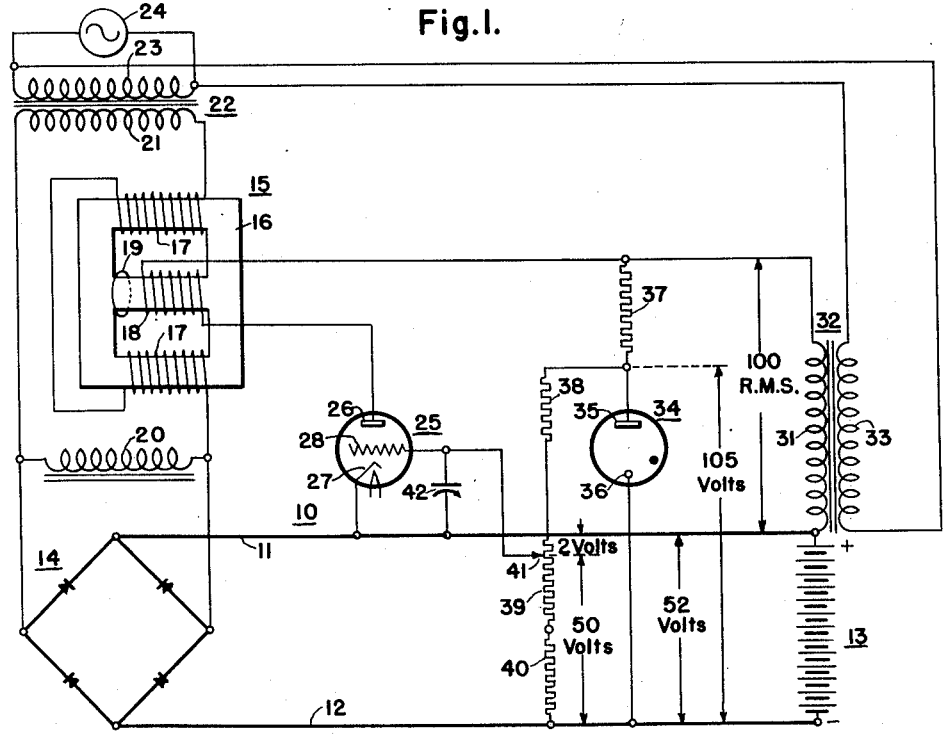
Figure 1 illustrates diagrammatically the basic circuit connections that may be employed for practicing this invention for controlling the flow of current from a source to a load circuit.

Referring now particularly to Figure 1 of the drawings, it will be observed that the reference character 10 designates, generally, a load circuit comprising conductors 11 and 12 between which a battery, illustrated generally at 13, may be connected for charging. For purposes of description the battery 13 is indicated as having a normal voltage of 52 volts. This voltage is commonly employed in telephone systems of the common battery type. It will be understood, however, that the present invention is not limited to the control of batteries operating at a voltage of 52 volts, but that the invention may be employed for controlling the charging of batteries operating at other voltages or for the energization of other types of load circuits, not including a battery, which require direct current for their energization.

It is pointed out here that while reference will be made hereinafter to other specific voltages and certain values of resistances, these are mentioned solely for purposes of illustration, it being understood that other voltages and other values of resistance may be employed as the situation warrants.

One means for providing a source of direct current for charging the battery 13 may be a rectifier, such as illustrated at 14, of the dry type. The rectifier 14 may be of the selenium or copper oxide type, the operating temperature of which should not exceed a predetermined value if it is to have a relatively long operating life. As will appear hereinafter, provision can be made for controlling the energization of the load circuit 10 from the dry type of rectifier 14 so that its safe-operating temperature will not be exceeded.

Any suitable means can be employed for controlling the energization of the rectifier 14. For example, a saturable core reactor, illustrated generally at 15, may be used. The reactor 15 has a core 16 of magnetic material on the end legs of which alternating current windings 17 may be located and connected in series as illustrated. A control winding 18, arranged to be energized by direct current, may be located on the middle leg in accordance with standard practice. A short circuited sleeve or winding 19 may be located on the middle leg to limit the change in flux during periods when no current flows through the winding 18. A reactor 20 is connected between the conductors to the rectifier 14 to provide a minimum load for reactor 15. The rectifier 14 may be energized from a secondary winding 21 of a transformer, shown generally at 22, having a primary winding 23 that may be connected for energization across a source 24 of alternating current. It will be understood that the source 24 of alternating current may be a conventional 60-cycle source arranged to deliver an appropriate voltage, such as 110, 220 or 440 volts.

The current flow through the control winding 18 may be controlled by a gas-filled electric valve that is illustrated, generally, at 25. The valve 25 may be of the 2050 type and for purposes of illustration in Figure 1 is shown as having an anode 26, an indirectly heated cathode 27, and a control electrode 28. The cathode 27 may be connected to conductor 11 of the load circuit 10, while the anode 26 may be connected to one terminal of the control winding 18. The other terminal of the control winding 18 may be connected to one terminal of a secondary winding 31 of a transformer, shown generally at 32, having a primary winding 33 that may be connected, as shown, for energization to the alternating current source 24. The other terminal of the secondary winding 31 is connected, as shown, to the conductor 11 so that the alternating voltage which appears across the terminals of the secondary winding 31 is applied in series with the direct current voltage of the battery 13. The design of the transformer 32 may be such that the R. M. S. voltage appearing across the terminals of the secondary winding 31 may be 100 volts which is applied across the valve 25. If desired, a higher voltage may be used by suitably extending winding 31.

In order to provide for controlling accurately the conductivity of the valve 25, a fixed reference voltage is provided which may be compared with the variable voltage of the battery 13. It will be understood that the voltage of the battery 13 will depend upon the load that is being drawn from it and its state of charge. By providing a fixed reference voltage for comparison with the variable battery voltage, it is possible, in accordance with the present invention, to control accurately the conductivity of the valve 25 and, in turn, the energization of the load circuit 10 from the source 24.

With a view to providing the desired fixed reference voltage, an electric valve 34 of the gas-filled type may be employed having an anode 35 and a cold cathode 36. The valve 34 is what is known in the industry as type VR 105 and has the characteristic that, when it is rendered conducting by the application of sufficient voltage across the anode 35 and cathode 36 to cause current flow therethrough, the voltage drop across the same is 105 volts as indicated. Other similar types of constant voltage devices can be employed, type VR 105 being shown for illustrative purposes. It will be noted that the valve 34 is connected across the battery 13 and secondary winding 31 of the transformer 32 through a resistor 37 which may have a resistance of 3,000 ohms.

Since the critical voltage of 105 volts is applied across the valve 34 only during half cycles when the anode 35 is positive and a lesser voltage is applied during successive half cycles, it is unnecessary to provide means for preventing the valve 34 from becoming conducting during such successive half cycles, thereby avoiding reverse current flow through the valve 34 and shortening its life.

Voltage divider resistance means in the form of resistors 38, 39 and 40 may be connected, as shown, across the valve 34. Since the voltage across the valve 34, when conducting, is constant, regardless of the current flow therethorugh, the voltage across the voltage divider resistors 38, 39 and 40 also is constant. Accordingly, it is possible to connect the control electrode 28 by means of a slider contact 41 to resistor 39 at a fixed voltage with respect to conductor 12. As illustrated in the drawings, this voltage is 50 volts and the voltage between the slider contact 41 and conductor 11 or cathode 27 is 2 volts when the battery 13 delivers a voltage of 52 volts. It will be understood, that as the battery voltage increases or decreases, the negative voltage applied to the control electrode 28 with respect to the cathode 27 will vary correspondingly. The valve 25 has the characteristic that it becomes conducting when the voltage applied to the control electrode 28 is 2 volts negative with respect to the cathode 27. If this voltage is more than 2 volts, the valve 25 is nonconducting. Since the valve 25 must be rendered conducting during alternate half cycles of the alternating current if such action is desired, it will be understood that it functions like a switch to open or close the energizing circuit for the control winding 18.

A capacitor 42 may be provided, as shown, between the control electrode 28 and cathode 27 to prevent the application of a peak control voltage to the former when the valve 34 becomes conducting in the half cycle of the alternating current applied from the secondary winding 31.

Figure 2:
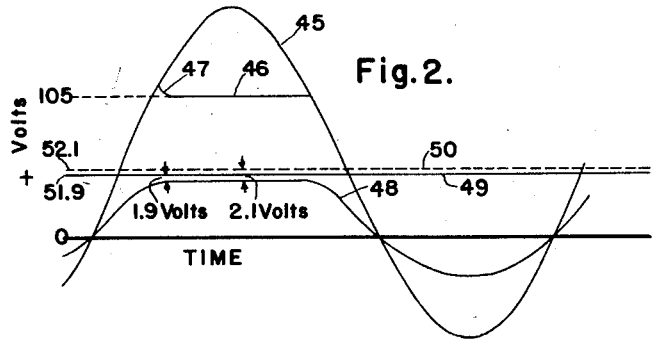
Figure 2 shows curves which demonstrate the operating characteristics of the circuits shown in Figure 1.

Reference now may be had to the curves, as shown in Figure 2, for a more complete understanding of the functioning of the system illustrated in Figure 1 and described hereinbefore. The curve 45 represents the wave form of the alternating current applied by the secondary winding 31 of the transformer 32. Preferably the resistances of the resistors 38, 39 and 40 are, respectively 100,000, 20,000, and 80,000 ohms which are high with respect to the resistance of the resistor 37. Under these circumstances, the voltage across the valve 34, represented by the curve 46, substantially coincides with the voltage across the secondary winding 31, represented by the curve 45, except for the time during which the valve 34 is conducting. As indicated at 47 on the curve 46, the voltage at which the valve 34 becomes conducting is slightly higher than the sustained voltage thereacross as indicated by the flat portion of the curve 46. The curve 48 represents the voltage that is applied to the control electrode 28. Because of the presence of the capacitor 42, the starting peak voltage 47 is not reflected in the voltage applied to the control electrode 28 as represented by the curve 48.

When the voltage of the load circuit 10 or the battery 13 is slightly below the normal 52 volts, such as at a voltage of 51.9 volts, represented by the straight line 49, a negative voltage of 1.9 volts is applied to the control electrode 28 with respect to the cathode 27 and, as a result, the valve 25 is rendered conducting during alternate half cycles of the alternating current. When the voltage of the load circuit 10 or of the battery 13 is above the normal voltage of 52 volts, for example, it operates at a voltage of 52.1 volts, as represented by the broken line 50, then a negative voltage of 2.1 volts is applied to the control electrode 28 with respect to the cathode 27 and the valve 25 is rendered non-conducting.

In the manner and circumstances as described, the valve 25 functions like a switch for either energizing or deenergizing the control winding 18 of the saturable core reactor 15 to, in turn, control the saturation of the core 16 and thereby the energization of the rectifier 14 and the flow of direct current therethrough to the load circuit 10 for charging the battery 13, the degree of saturation being proportional to the average anode current through the valve 25. The magnitude of the current flowing through the rectifier 14 is determined by the number of half cycles that the valve 25 is rendered conducting or the average direct current flow through the control winding 18 and the characteristics of the circuit including the secondary winding 21 and saturable core reactor 15. Accordingly, a smooth continuous control of the flow of current from the rectifier 14 to the load circuit 10 is provided. Thus the invention can be used not only for controlling the supply of current to the load circuit 10 for charging the battery 13, but also it may be used to control the flow of current to any load circuit requiring direct current.

As will appear hereinafter, instead of the rectifier 14 of the dry type, a rectifier of the tube or electronic type may be employed. Also a direct current generator of the dynamo-electric type may be used, to supply the direct current for the load circuit 10 and for charging the battery 13. Moreover, instead of the saturable core reactor 15 for controlling the circuit connections between the rectifier 14 and the secondary winding 21, a relay may be employed. If a relay is used, it may be connected either between the secondary winding 21 and the rectifier 14 or between the rectifier 14 and the load circuit 10 as circumstances may dictate.

Figure 3:
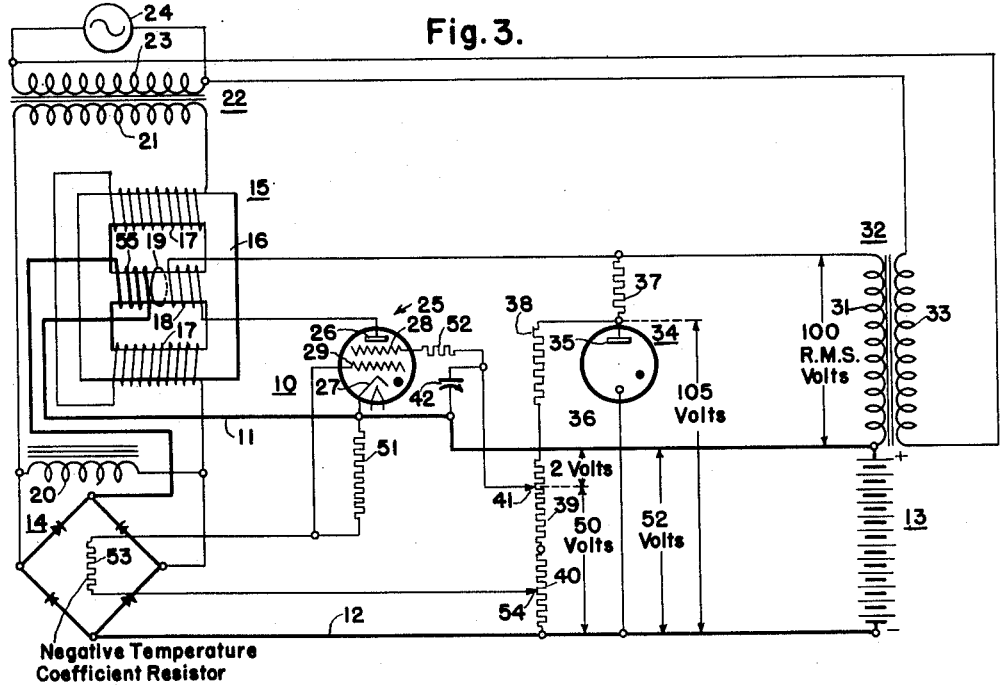
Figure 3 illustrates a modification of the circuit shown in Figure 1 in that a temperature control feature responsive to the temperature of the rectifier is incorporated for obtaining an additional control.

In Figure 3 of the drawings, there is illustrated a modification of the system as shown in Figure 1 and described hereinbefore wherein provision is made for controlling the conductivity of the valve 25 in accordance with the temperature of the rectifier 14 in addition to the control that is provided in accordance with the voltage of the battery 13. The safe-operating temperature of a rectifier of the dry type, such as rectifier 14, is relatively low. It is likely to be overheated when the drain on the battery 13 is heavy and excess current flows through the rectifier 14.

With a view of providing this additional control feature, the valve 25 may be provided with an additional control electrode 29 which is similar to the control electrode 28 so far as its control of the operating characteristics of the tube 25 is concerned. The control electrode 29 may be connected through a resistor 51, having a resistance of 5,000 ohms to the cathode 27. If the resistance of the voltage divider resistors 38, 39 and 40 is not sufficiently high, the control electrode 28 may be connected through a resistor 52, having a resistance of 200,000 ohms to the slider connector 41.

The temperature of the dry type rectifier 14 may be measured by a resistor 53 located in close proximity thereto and having a relatively high negative temperature coefficient. For example, the resistor 53 may be such that its resistance is halved for every 40° F. increase in its temperature. At normal room temperature of 75° F., the negative temperature coefficient resistor 53 may have a resistance of 125,000 ohms. As shown, the negative temperature coefficient resistor 53 is connected between the control electrode 29 and by a slider contact 54 to a point along resistor 40 where the resistance between the contact 54 and conductor 12 is about 15,000 ohms.

It will be observed that the negative temperature coefficient resistor 53 is connected in series circuit relation with resistor 51 and the lower portion of resistor 40 across the load circuit 10 or battery 13. The current flowing through this series circuit causes the voltage applied to control electrode 29 to become more negative with respect to cathode 27 while the voltage of control electrode 28 with respect to the cathode 27 becomes less negative. Using the proportions specified for the resistors 40 and 51, these two effects on the voltages applied to the control electrode 28 and 29 substantially neutralize each other so that the performance of the valve 25 is unaffected.

Now, if the resistance of negative temperature coefficient resistor 53 is reduced on increased temperature of the rectifier 14, the voltage applied to control electrode 29 will become still more negative and that applied to the control electrode 28 with respect to cathode 27 will become less negative until a point is reached where the voltage applied to the control electrode 28 equals that applied to the cathode 27 or zero voltage is applied therebetween. If the resistance of negative temperature coefficient resistor 53 is reduced still further, the control electrode 29 will become more negative with respect to cathode 27, while there will be a tendency for the application of a positive voltage to control electrode 28 with respect to cathode 27. When this occurs, current tends to flow through the resistor 52, but, since it has a relatively high resistance, no appreciable current will flow and, as a result, the control electrode 28 remains at exactly the same voltage as the cathode 27. A further decrease in the resistance of negative temperature coefficient resistor 53 due to increase in temperature of the rectifier 14 increases the negative voltage applied to the control electrode 29 with respect to the cathode 27 but there is not a corresponding increase in positive voltage applied to the control electrode 28. Therefore, the arrangement is such that, when the temperature of the rectifier 14 exceeds the predetermined operating temperature as reflected by the reduction in the resistance of resistor 53, the voltage of the control electrode 29 with respect to the cathode 27 will be made sufficiently negative so that the valve 25 is rendered nonconducting even though from the standpoint of the voltage of the load circuit 10 or of the battery 13 the valve 25 would otherwise remain in the conducting state. Thus, as long as the temperature of the dry type rectifier 14 remains below the predetermined operating temperature, the control of the conductivity of the valve 25 is effected entirely by the voltage that is applied to the control electrode 28 which results from the comparison between the voltage of the load circuit 10 or the battery 13 with the fixed reference voltage provided by the valve 34. Any change introduced by change in resistance of negative temperature coefficient resistor 53 on control electrode 29 is cancelled by the corresponding opposite change with respect to the control electrode 28. However, as described when the resistance of the resistor 53 is reduced below the critical value, corresponding to the operating temperature of the dry type rectifier 14 which should not be exceeded, the control electrode 29 becomes sufficiently negative with respect to the cathode 27 to cause the valve 25 to be rendered nonconducting.

With a view to reducing the required current flow through the valve 25 for energizing the winding 18 to control the saturation of core 16, a booster or helper winding 55 may be located on the middle leg and connected in series with conductor 11. As the load on the circuit 10 increases and there is a corresponding voltage drop, the increased current flow through winding 55 further increases the saturation of the core 16 and effects a corresponding increase in the voltage applied to the rectifier 14.

Figure 4:
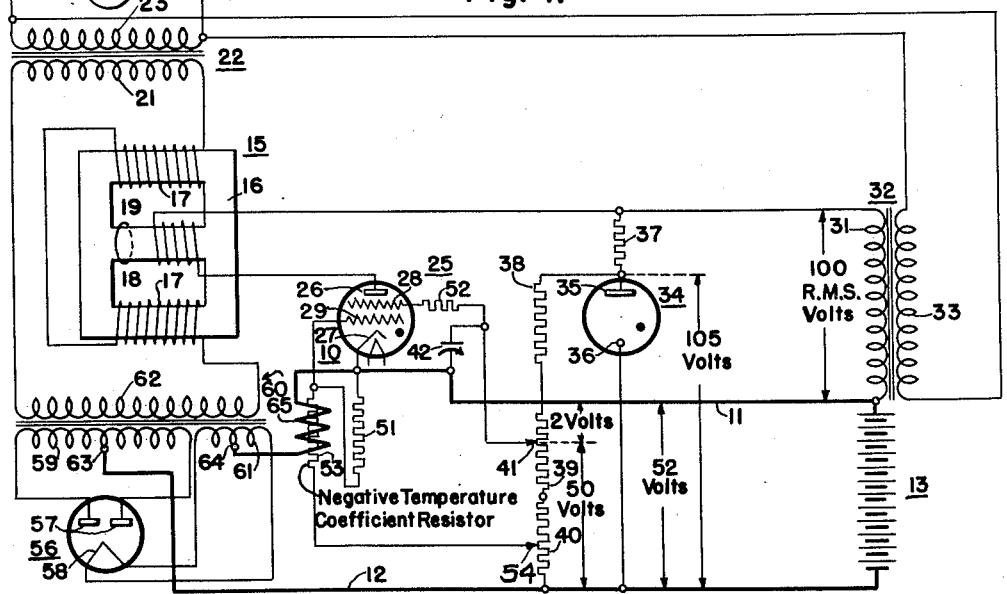
Figure 4 illustrates another modification wherein provision is made for control in accordance with current flow to prevent the rectifying apparatus from operating when the current flow thereto exceeds a predetermined value.

In Figure 4 of the drawings there is illustrated, generally, at 56 a tube type electronic rectifier for converting the alternating current from the source 24 into direct current for energizing the load circuit 10 and charging the battery 13. The tube type rectifier 56 is of conventional construction and may include anodes 57 and a cathode 58. The anodes 57 may be connected to the terminals of a secondary winding 59 of a transformer that is shown, generally, at 60. The cathode 58 may be connected for energization to an auxiliary secondary winding 61, which, for illustrative purposes, is shown on transformer 60. If it is desired that it be unaffected by the control provided by the reactor 15, it may be located on the transformer 22. The transformer 60 may have a primary winding 62 that may be connected for energization to the secondary winding 21 of the transformer 22 through suitable control means, such as the saturable core reactor 15. The secondary winding 59 may have a center tap 63, to which load circuit conductor 12 may be connected. Likewise, the auxiliary secondary winding 61 may have a center tap 64 to which the other load circuit conductor 11 may be connected.

One of the characteristics of a tube type rectifier, such as the rectifier 56, is that the normal current rating should not be exceeded in order to prolong the life of the device. While the heat generated by a rectifier of this type reflects the current flow therethrough, it may not provide a reliable indication of the current flow because of the difficulty in making the necessary temperature measurement outside of the envelope of the device. Accordingly, provision may be made for employing the temperature responsive system illustrated in Figure 3 and described hereinbefore modified in a manner to make the negative temperature coefficient resistor 53 respond to heat generated by current flow through the rectifier 56. For this purpose, as illustrated in Figure 4, a heating coil 65 is connected in the conductor 11 between the load circuit 10 and the center tap 64 of the auxiliary secondary winding 61. The heating coil 65 is located in heat transfer relation with the resistor 53 so that the resistance thereof accurately reflects the current flowing through the rectifier 56. All that is required is that the current flow through the heating coil 65 be a function of the current flowing through the rectifier 56.

The functioning of the system illustrated in Figure 4 is essentially the same as the functioning of the system shown in Figure 3 and described hereinbefore, modified by controlling the temperature of the negative temperature coefficient resistor 53 in accordance with the current flowing through the rectifier 56 or a function thereof rather than controlling the resistance of the resistor 53 directly in accordance with the heat generated by the rectifier.

Figure 5:
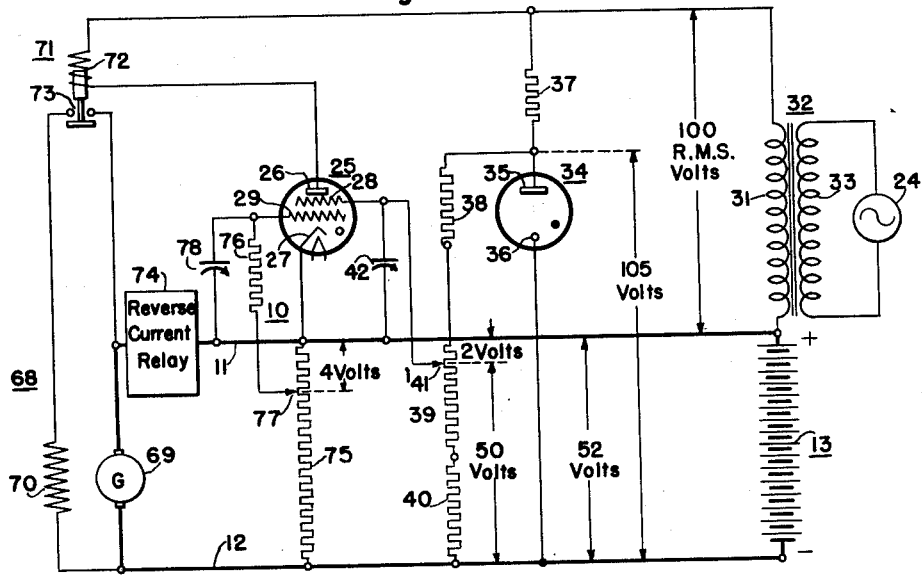
Figure 5 illustrates, diagrammatically, how a relay can be employed for effecting the desired control and showing how the relay can be caused to operate at substantially different circuit or battery voltages to prevent its pumping.

In Figure 5 of the drawings there is illustrated a system wherein the load circuit 10 is supplied with direct current from a direct current generator, shown generally at 68, of the dynamoelectric type having an armature 69 connected between the conductors 11 and 12 and a shunt field winding 70, the energization of which may be controlled by a relay, shown generally at 71. The relay 71 has an operating winding 72 that may be connected in the circuit to the anode 26 of the valve 25. It may also have normally open contacts 73 which, when closed, connect the field winding 70 for energization across the conductors 11 and 12. A reverse current relay 74 of conventional construction may be interposed between the load circuit 10 and the armature 69 to prevent current flowing in a reverse direction when the generator 68 is not functioning.

It will be understood that the relay 71 can be controlled by a circuit, such as that illustrated in Figure 1. The only change that would be required is that the operating winding 72 be substituted for the control winding 18 of the saturable core reactor 15. One objection to using the circuit as illustrated in Figure 1 for controlling the functioning of the relay 71 is that pumping of the relay would result. As soon as the voltage of the battery 13 is reduced to such a point that the valve 25 becomes conducting, the relay 71 would be energized. The relay 71 operating causes the application of charging current to the load circuit 11 from the generator 68, for example, or from the rectifier 14, Figure 1 or rectifier tube 56, Figure 4, and raises the voltage of the load circuit 10 so that the valve 25 immediately becomes nonconducting. This results from the great sensitivity of the circuit illustrated in Figure 1. The relay 71 then drops out or the contacts 73 are opened. The cycle is then repeated. While such operation is not objectionable when a control employing a saturable core reactor or the like is used, since there the saturation of the core is a function of the average direct current flow, it is undesirable when a relay is employed. Accordingly, pursuant to the present invention, provision is made for causing the valve 25 to be rendered nonconducting at a voltage which is substantially higher than the voltage at which it is rendered conducting and vice versa so that the relay 71 remains in either the energized or deenergized position for an appreciable length of time. In effect what is provided is a voltage spread in the control of the functioning of the relay 71 so that it is energized when the voltage across the load circuit 10 drops to a value which is substantially lower than the voltage of the load circuit 10 at which the relay 71 is deenergized.

In order to obtain this voltage spread in the operation of the relay 71, a resistor 75 may be connected across the load circuit 10 and the control electrode 29 may be connected thereto through a resistor 76 and a slider contact 77. The resistor 75 may have a resistance of 10,000 ohms while the resistor 76 may have a resistance of 200,000 ohms. A capacitor 78 is connected between the control electrode 29 and the cathode 27, as shown.

In order to obtain the voltage spread in the operation of the relay 71 advantage is taken of certain operating characteristics of the electric valve 25. These characteristics are shown in the following tables:

Table I

| Volts 28–27 | Volts 29–27 | Milliamperes (26 Nonconducting) 29–27 |
|---|---|---|
| 0 | −4 | 0 |
| −1 | −2.5 | 0 |
| −2 | 0 | 0 |
| −2.5 | +4 | 0.5 |

Table II

| Anode-Cathode | Control Electrode-Cathode Voltage | Control Electrode-Cathode Current |
|---|---|---|
| Not conducting | Negative | No. |
| Do | Positive | Yes. |
| Conducting | Negative | Yes. |
| Do | Negative | Yes. |

Table I shows combinations of critical voltages between the electrodes 28 and 29 and the cathode 27 when no current flows through the circuit including the anode 26, and 100 R. M. S. volts alternating current are applied between the anode 26 and the cathode 27. If either control electrode 28 or 29 is more positive (less negative) than the specified critical value, the valve 25 is rendered conducting while if either control electrode 28 or 29 is more negative than the specified critical value, the valve 25 is rendered non-conducting.

Ordinarily no current flows through the circuits including the control electrodes 28 and 29. However, there are conditions under which current will flow in these circuits. These conditions are determined by whether one or the other of the control electrodes 28 and 29 is positive or negative with respect to the cathode 27 and whether or not the valve 25 has been rendered conducting and current is flowing therethrough. If the valve 25 is nonconducting, no current will flow in either of the circuits including the control electrode 28 or 29 as long as they are negative with respect to the cathode 27. However, current can flow in these circuits if either of the control electrodes 28 or 29 is positive with respect to the cathode 27. If current is flowing through the valve 25, a conducting path also exists from either control electrode 28 or 29 to the cathode 27 and current will flow in the circuits thereto if the control electrodes 28 or 29 are either negative or positive with respect to the cathode 27. These various conditions are set forth in Table II above. While they are typical of a tube of the 2050 type referred to hereinbefore, it will be understood that any other tube having similar characteristics can be employed instead of this particular type.

In describing the functioning of the system illustrated in Figure 5, it will be assumed first, that the voltage of the battery 13 is 52 volts and that the valve 25 is not conducting. Further, it will be assumed that the slider contact 77 is located along the resistor 75 at such a position that the control electrode 29 is four volts negative with respect to the cathode 27. By referring to Table I above, it will be observed that, under these conditions, the voltage between control electrode 28 and cathode 27 must be zero if the valve 25 is to be rendered conducting. In order to accomplish this, the voltage of the battery 13 or of the load circuit 10 must be reduced to 50 volts. When this occurs, the valve 25 is rendered conducting, operating winding 72 of the relay 71 is energized, and contacts 73 are closed. The shunt field winding 70 of the generator 68 is energized and the generator 68 supplies current to the load circuit 10 for charging the battery 13.

When the valve 25 is rendered conducting, as shown in Table II above, current flows in the circuit including the control electrode 29. Since the resistance of resistor 76 is relatively high, it will not pass an appreciable amount of current and, accordingly, the voltage applied to the control electrode 29 drops substantially to zero with respect to the cathode 27 as soon as current begins to flow through the valve 25 for energizing the operating winding 72 of the relay 71. During the half cycles when the valve 25 is nonconducting, the capacitor 78 does not have time to recharge and thus the control electrode 29 remains at the same voltage as the cathode 27.

Referring now to Table I, it will be observed that when the voltage of control electrode 29 is zero with respect to the cathode 27, the voltage of control electrode 28 must be two or more volts negative with respect to cathode 27 before the valve 25 will be rendered nonconducting. Accordingly, the voltage of the load circuit 10 or of the battery 13 must rise to 52 volts before the valve 25 is rendered nonconducting and the operating winding 72 of relay 71 is energized. Thereupon contacts 73 are opened and the field winding 70 is deenergized. The generator 68 then ceases to supply current to the load circuit 10.

When the valve 25 is rendered nonconducting, current no longer flows in the circuit including the control electrode 29 and its voltage with respect to the cathode 27 is restored to a negative four volts. Accordingly, the voltage of the load circuit 10 or of the battery 13 must again fall to 50 volts in order to again effect the operation of the relay 71. By adjusting the position of the slider contact 77 along the resistor 75, it is possible to obtain, within limits, any desired spread in the functioning of the relay 71.

It will be apparent that the rectifier 14 of the dry type or the rectifier 56 of the tube type, illustrated respectively in Figures 1 and 4, may be employed in lieu of the generator 68 and that the relay 71 can be arranged to control the energization of the control winding 18 of the saturable core reactor 15, or as described hereinafter, the saturable core reactor 15 can be omitted and the contacts 73 of the relay 71 interposed in the circuit in lieu thereof.

Figure 6:
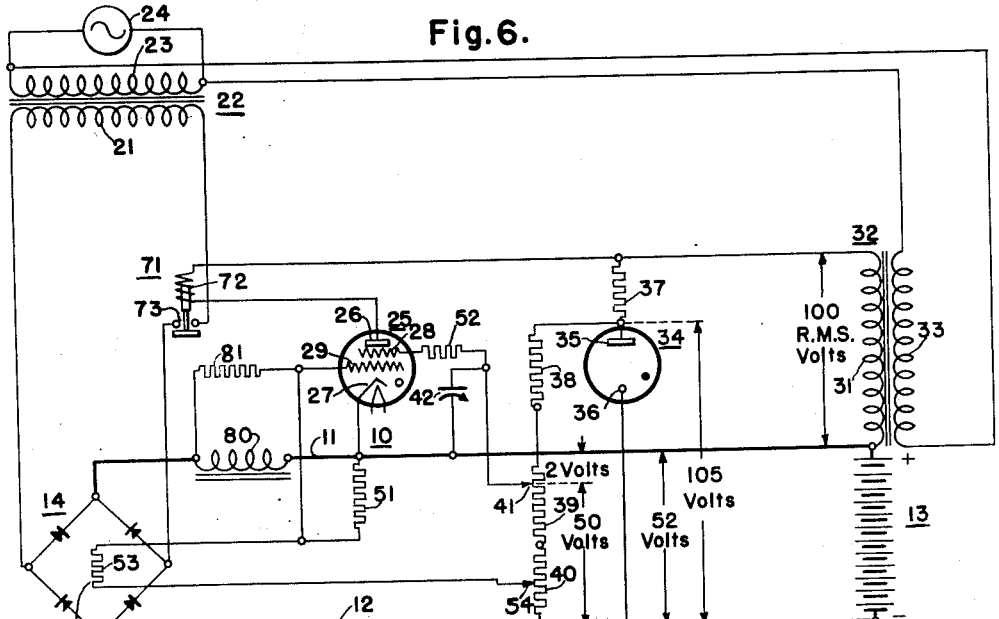
Figure 6 illustrates, d.agrammatically, how the temperature control feature can be combined with the anti-pumping control of the relay in a single system.

In Figure 6 of the drawings, the relay 71 is illustrated for controlling the energization of the dry type of rectifier 14 described hereinbefore. The system there shown also includes a negative temperature coefficient resistor 53 for protecting the rectifier 14 against operation under abnormally high temperature conditions as illustrated in Figure 3 and described hereinbefore.

In order to obtain the voltage spread in the operation of the relay 71, a filter choke 80 may be connected in the load circuit conductor 11 between the load circuit 10 and the rectifier 14. It will be understood that similar chokes may be employed in the circuits as illustrated in Figures 1, 3 and 4 of the drawings where the supply originally comes from an alternating current source. However, for purposes of simplicity, such chokes have been omitted from these illustrations. A resistor 81, having a resistance of 75,000 ohms is interposed between the control electrode 29 and the choke 80 so that, when the relay 71 is energized, the ripple voltage across the choke 80 is applied to the control electrode 29. This ripple voltage tends to maintain the valve 25 in the conducting state so that the voltage of the load circuit 10 or of the battery 13 must rise a definite amount before the valve 25 is rendered nonconducting.

Insofar as the control of the relay 71 is concerned, the system illustrated in Figure 6 functions like the system illustrated in Figure 5. In addition the temperature control feature, illustrated in Figure 6, is incorporated in the system.

Instead of employing the ripple voltage obtained from the filter choke 80 to provide the voltage spread for the operation of the relay 71, a corresponding control voltage can be obtained by providing a suitable auxiliary secondary winding 21a on the transformer 22 (Figure 6a). Also, a resistor 51a (Figure 6b) can be substituted for the choke 80 and resistor 81 to provide the same results.

In Figure 7 of the drawings there is illustrated another form of the system wherein the desired voltage spread for the operation of the relay 71 can be obtained while retaining the temperature control feature. It will be observed that the relay 71 is provided with an additional set of contacts 83 and that these contacts, when closed, shunt a portion 84 of the resistor 38, thereby changing the fixed reference voltage with which the voltage of the load circuit 10 or of the battery 13 is compared. By thus changing the reference voltage, the valve 25 is rendered conducting when the voltage of the load circuit 10 or of the battery 13 drops to a predetermined value and it is rendered nonconducting when this voltage reaches a substantially higher value.

In the systems illustrated in Figures 5, 6 and 7, where a relay is employed for controlling the energization of the load circuit 10 from the current source, it will now be apparent that it is desired to hold the relay 71 in energized condition after it has operated as a result of the load circuit or battery voltage dropping to a predetermined value until this voltage has risen a definite amount which is substantially greater than the voltage at which the relay 71 operated. In Figure 5, the holding circuit for the relay 71 is provided before it operates while in the circuit shown in Figures 6 and 7, the holding circuit is provided after the relay operates to maintain the same in the energized position. When the system illustrated in Figure 5 is employed, since the holding circuit is completed before the relay 71 operates, as soon as the valve 25 is rendered conducting, the relay 71 is operated without hesitation and remains closed. On the other hand, when the systems illustrated in Figures 6 and 7 are employed, since the holding circuit is not established until after the relay 71 has operated, there is a tendency for the relay 71 to be energized momentarily when the valve 25 is rendered conducting for a half cycle and then during several succeeding half cycles of the same polarity, it is not rendered conducting. This causes the relay 71 to start to operate, but it does not cause it to operate fully. However, as soon as the valve 25 is rendered conducting for a time sufficient to effect the complete operation of the relay 71, the holding circuit is established, as described, and it remains energized until the voltage of the load circuit 10 or of the battery 13 has risen a substantial amount as described.

Since certain further changes can be made in the foregoing construction and circuits without departing from the spirit and scope of this invention, it is intended that all matter shown in the accompanying drawings and described hereinbefore shall be interpreted as illustrative and not in a limiting sense.

What is claimed as new is:

1. Means for controlling the flow of current from a current source of variable voltage to a load circuit comprising, in combination, means for deriving from said variable potential source a fixed alternate half-cycle reference voltage, means for comparing the voltage of said load circuit with said alternate, half-cycle reference voltage, and means for controlling the energization of said load circuit from said current source in accordance with a predetermined relationship between said voltages.

2. Means for controlling the flow of current from a current source of variable voltage to a load circuit comprising, in combination, means for deriving from said variable potential source a substantially constant reference voltage, means for comparing the voltage of said load circuit with said reference voltage; electric valve means having an anode, a cathode, and a control electrode; means for applying the resultant voltage from the comparison of said reference and load circuit voltages to said control electrode to render said valve means conducting only on alternate half-cycles responsive to a predetermined resultant voltage, and means controlled by said electric valve means for controlling the energization of said load circuit from said current source.

3. In circuit means having a source of alternating current potential for energizing same, said means being adapted for controlling the flow of current from a current source of variable voltage to a load circuit and comprising, in combination, means for deriving from said variable potential source a fixed reference voltage only during alternate half-cycles of said alternating current source, means for comparing the voltage of said load circuit with said alternate, half-cycle reference voltage; electric valve means of the gas-filled type having an anode, a cathode and a control electrode; means for connecting said anode for energization to said alternating current source, means for applying the resultant voltage from the comparison of said reference and load circuit voltages to said control electrode to render said valve means conducting only during alternate half-cycles of said alternating current responsive to a predetermined value of resultant voltage, and means energized in accordance with the current flow from said alternating current source through said electric valve means for controlling the energization of said load circuit from the first mentioned current source.

4. In circuit means having an alternating current potential source for energizing same, said means being adapted for controlling the flow of current from a current source to a load circuit and comprising, in combination, means for applying the voltage of said alternating current source in series relation with the voltage of said load circuit, circuit means including a device having a substantially constant voltage drop on variable current flow therethrough connected across said series related voltages whereby a fixed reference voltage is established, means for comparing the voltage of said load circuit with said reference voltage, and means for controlling the energization of said load circuit from said current source in accordance with a predetermined relationship between said load voltage and said reference voltage.

5. In circuit means having an alternating current potential source for energizing same, said means being adapted for controlling the flow of current from a direct current source to a load circuit and comprising, in combination, means for applying the voltage of said alternating current source in series relation with the direct current voltage of said load circuit, circuit means including a device having a substantially constant voltage drop on current flow therethrough connected across said series related voltages whereby a fixed alternate, half-cycle reference voltage is established, means for comparing the voltage of said load circuit with said reference voltage; electric valve means having an anode, a cathode, and a control electrode; means for applying the resultant alternate, half-cycle voltage which is obtained from the comparison of said reference and load circuit voltages to said control electrode to render said valve means conducting or nonconducting depending upon the character of said resultant voltage, and means controlled by said electric valve means for controlling the energization of said load circuit from said current source.

6. In circuit means having an alternating current potential source for energizing same, said means being adapted for controlling the flow of current from a direct current source to a load circuit comprising, in combination, means for connecting said alternating current voltage source in series with a portion of the direct current load circuit whereby said alternating current and direct current voltages are applied in series relation, circuit means including a device having a substantially constant voltage drop on current flow therethrough connected across said series related voltages whereby a fixed reference voltage is established on alternate half-cycles of said alternating current supplied by said source, means for comparing the voltage of said load circuit with said reference voltage; electric valve means of the gas-filled type having an anode, a cathode and a control electrode; means for connecting said anode for energization to a source of alternating current, means for applying the resultant voltage from the comparison of said reference and load circuit voltages to said control electrode to render said valve means conducting only during alternate half cycles of said alternating current responsive to a predetermined value of resultant voltage, and means energized in accordance with the current flow from said alternating current source through said electric valve means for controlling the energization of said load circuit from the first mentioned current source.

7. In battery charging means having an alternating source of potential, said means being adapted for controlling the charging of a battery from a source of direct current and comprising, in combination, means for connecting said source of alternating current in series circuit relation with said battery, a gas-filled electric valve providing a substantially constant voltage drop on current flow therethrough connected across said battery and said alternating current source; a gas-filled electric valve having an anode, a cathode and a control electrode; means for connecting said anode to one terminal of said alternating current source and said cathode to the common connection between said alternating current source and said battery, voltage dividing means connected across the first mentioned electric valve, means for connecting said control electrode to said voltage dividing means to render the second mentioned electric valve conducting during alternate half cycles of said alternating current when the voltage of said battery is reduced a predetermined amount, and means energized in accordance with the current flow from said alternating current source through said second mentioned electric valve for controlling the charging of said battery from said direct current source.

8. Means for controlling the charging of a battery by means of a rectifier that is adversely affected when it exceeds a predetermined operating temperature comprising, in combination, temperature responsive means positioned to be affected by heat generated by said rectifier, means for establishing a fixed reference voltage, means for comparing the voltage of said battery with said reference voltage, and means for controlling the energization of said rectifier in accordance with the functioning of said temperature responsive means and a predetermined relationship between said voltages.

9. Means for controlling the charging of a battery by means of a rectifier that is adversely affected when it exceeds a predetermined operating temperature comprising, in combination, a negative temperature coefficient resistor positioned to be affected by the heat generated by said rectifier, means for establishing a fixed reference voltage, voltage divider means connected across said means and said battery for comparing the voltage thereof with said reference voltage; an electric valve of the gas-filled type having an anode, a cathode, and a pair of control electrodes; means for connecting said anode for energization to a source of alternating current, means for connecting one of said control electrodes to said voltage divider means to render said valve conducting during alternate half cycles of said alternating current when the voltage of said battery is reduced to a predetermined amount, circuit means connecting the other control electrode through said resistor to said voltage divider means whereby the conductivity of said valve is unaffected by change in the resistance of said resistor until the same is reduced to an amount corresponding to said operating temperature of said rectifier whereupon said valve is rendered nonconducting, and means energized in accordance with the current flow from said alternating current source through said electric valve for controlling the charging of said battery from said rectifier.

10. The invention, as set forth in claim 9, wherein means is provided for connecting a source of alternating current in series circuit relation with the battery, and the means for establishing a fixed reference voltage comprises a gas-filled electric valve having a substantially constant voltage drop on current flow therethrough and it is connected across said battery and said alternating current.

11. Means for controlling the charging of a battery by means of a rectifier that is adversely affected when the current flow therethrough exceeds a predetermined amount comprising, in combination, temperature responsive means positioned to be affected by heat generated by current flow through said rectifier, means for comparing the voltage of said battery with said reference voltage, and means for controlling the energization of said rectifier in accordance with the functioning of said temperature responsive means and a predetermined relationship between said voltages.

12. Means for controlling the charging of a battery by means of a rectifier that is adversely affected when the current flow therethrough exceeds a predetermined amount comprising, in combination, a negative temperature coefficient resistor, a heating element in heat transfer relation to said resistor connected to have the current flow therethrough a function of the current flow through said rectifier, means for establishing a fixed reference voltage, voltage divider means connected across said means and said battery for comparing the voltage thereof with said reference voltage; an electric valve of the gas-filled type having an anode, a cathode, and a pair of control electrodes; means for connecting said anode for energization to a source of alternating current, means for connecting one of said control electrodes to said voltage divider means to render said valve conducting during alternate half cycles of said alternating current when the voltage of said battery is reduced a predetermined amount, circuit means connecting the other control electrode through said resistor to said voltage divider means whereby the conductivity of said valve is unaffected by change in the resistance of said resistor until the same is reduced to an amount corresponding to said predetermined current flow through said rectifier whereupon said valve is rendered nonconducting, and means energized in accordance with the current flow from said alternating current source through said electric valve for controlling the charging of said battery from said rectifier.

13. The invention, as set forth in claim 12, wherein means is provided for connecting a source of alternating current in series circuit relation with the battery, and the means for establishing a fixed reference voltage comprises a gas-filled electric valve having a substantially constant voltage drop on current flow therethrough and it is connected across said battery and said alternating current.

14. Means for controlling the flow of current from a variable current source to a load circuit comprising, in combination, means for deriving a fixed reference voltage from the variable source, means for comparing the voltage of said load circuit with said reference voltage, a relay for controlling the energization of said load circuit from said current source, and means for effecting the operation of said relay from one position to another in accordance with one predetermined relationship between said voltages and for effecting its operation back to said one position in accordance with another substantially different predetermined relationship between said voltages to avoid operating the same on small changes of said load circuit voltage.

15. Means for controlling the flow of current from a current source to a load circuit comprising, in combination, means for establishing a fixed reference voltage, voltage divider means connected across said means and said load circuit for comparing the voltage thereof with said reference voltage, a relay having a winding and contacts for controlling the energization of said load circuit from said current source; an electric valve of the gas-filled type having an anode, a cathode, and a pair of control electrodes; means for connecting said anode for energization through said winding to a source of alternating current, means for connecting one of said control electrodes to said voltage divider means to render said valve conducting during alternate half cycles of said alternating current when the voltage of said load circuit is reduced a predetermined amount, and means for controlling the potential of the other control electrode with respect to said cathode whereby said valve is rendered nonconducting only when the voltage of said load circuit rises to a substantially higher value than that at which it became conducting and vice versa to avoid operating said relay on small changes of said load circuit voltage.

16. The invention, as set forth in claim 15, wherein a resistor is connected across the load circuit and the other control electrode is connected thereto through a resistor such that when the valve becomes conducting the potential applied to said other control electrode with respect to the cathode is reduced substantially to zero.

17. Means for controlling the charging of a battery by means of a rectifier that is adversely affected when it exceeds a predetermined operating temperature comprising, in combination, temperature responsive means positioned to be affected by heat generated by said rectifier, means for establishing a fixed reference voltage, means for comparing the voltage of said battery with said reference voltage, a relay for controlling the charging of said battery by said rectifier, and means for controlling the energization of said relay in accordance with the functioning of said temperature responsive means and two predetermined relationships between said voltages whereby said relay is energized when said battery voltage drops to a predetermined value and is deenergized only when said battery voltage rises to a substantially higher value and vice versa to avoid operating the same on small changes of said battery voltage.

18. Means for controlling the charging of a battery by means of a rectifier that is adversely affected when it exceeds a predetermined operating temperature comprising, in combination, a negative temperature coefficient resistor positioned to be affected by the heat generated by said rectifier, means for establishing a fixed reference voltage, voltage divider means connected across said means and said battery for comparing the voltage thereof with said reference voltage; an electric valve of the gas-filled type having an anode, a cathode, and a pair of control electrodes; a relay having a winding and contacts for operatively connecting said rectifier to said battery, means for connecting said anode for energization through said winding to a source of alternating current, means for connecting one of said control electrodes to said voltage divider means to render said valve conducting during alternate half cycles of said alternating current when the voltage of said battery is reduced a predetermined amount, circuit means connecting the other control electrode through said resistor to said voltage divider means whereby the conductivity of said valve is unaffected by change in the resistance of said resistor until the same is reduced to an amount corresponding to said operating temperature of said rectifier whereupon said valve is rendered nonconducting, and means for superimposing a control voltage on said other control electrode which is a function of the current flow through said rectifier whereby said valve remains conducting until said battery voltage rises to a substantially higher value than that at which it became conducting and vice versa to avoid operating said relay on small changes of said battery voltage.

19. The invention, as set forth in claim 18, wherein an impedance device is connected between the rectifier and battery and across the other control electrode and cathode through a resistor to provide the superimposed control voltage.

20. Means for controlling the charging of a battery by means of a rectifier that is adversely affected when it exceeds a predetermined operating temperature comprising, in combination, a negative temperature coefficient resistor positioned to be affected by the heat generated by said rectifier, means for establishing a fixed reference voltage, voltage divider means connected across said means and said battery for comparing the voltage thereof with said reference voltage; an electric valve of the gas-filled type having an anode, a cathode, and a pair of control electrodes; a relay having a winding and two sets of contacts, one set of contacts being arranged on energization of said winding to operatively connect said rectifier to said battery, and the other set being arranged to shunt a portion of said voltage divider means; means for connecting said anode for energization through said winding to a source of alternating current, means for connecting one of said control electrodes to said voltage divider means to render said valve conducting during alternate half cycles of said alternating current when the voltage of said battery is reduced a predetermined amount, and circuit means connecting the other control electrode through said resistor to said voltage divider means whereby the conductivity of said valve is unaffected by change in the resistance of said resistor until the same is reduced to an amount corresponding to said operating temperature of said rectifier whereupon said valve is rendered nonconducting, said other set of contacts on shunting said portion of said voltage divider means changing said reference voltage whereby said valve remains conducting until said battery voltage rises to a substantially higher value than that at which it became conducting and vice versa to avoid operating said relay on small changes of said battery voltage.

21. In circuit means having an alternating current source of energy for energizing same, said means being adapted for controlling the flow of current from a direct current source to a load circuit, and comprising, in combination, means for applying the voltage of said alternating current source in series relation with the direct current voltage of said load circuit, circuit means including a device having a substantially constant voltage drop on variable current flow therethrough, connected across said series related voltages whereby a fixed alternate half-cycle reference voltage is established, means for comparing the voltage of said load circuit with said reference voltage, and means for controlling the energization of said load circuit from said current source in accordance with a predetermined relation between said load voltage and said fixed alternate, half-cycle voltage.

22. In circuit means having a source of alternating current for energizing same, said means being adapted for controlling the flow of current from a current source to a load circuit and comprising in combination means for establishing a fixed reference voltage only during alternate half cycles of said alternating current, means for comparing the voltage of said load circuit with said alternate half cycle reference voltage, and means including a saturable core reactor energized in accordance with a predetermined resultant voltage to control the energization of said load circuit from said current source.

References Cited in the file of this patent

UNITED STATES PATENTS

| Number | Name | Date |
|---|---|---|
| 1,814,832 | Dome | July 14, 1931 |
| 1,826,754 | Ehrenhaft | Oct. 13, 1931 |
| 1,904,485 | Livingston | Apr. 18, 1933 |
| 2,031,509 | Seeley | Feb. 18, 1936 |
| 2,069,737 | Beetem | Feb. 9, 1937 |
| 2,079,500 | Foos | May 4, 1937 |
| 2,258,607 | Grabau | Oct. 14, 1941 |
| 2,262,845 | Hartley et al. | Nov. 8, 1941 |
| 2,306,593 | Collom | Dec. 29, 1942 |
| 2,331,131 | Moyer | Oct. 5, 1943 |
| 2,563,179 | Malsbarry | Aug. 7, 1951 |